United States Patent [19]
Leuchs et al.

[11] Patent Number: 5,177,566
[45] Date of Patent: Jan. 5, 1993

[54] INTERFEROMETER WITH ENVIRONMENT SENSITIVE STATIC ETALON

[75] Inventors: Gerhard Leuchs, Azmoos; Martin Kerner, Kirchdorf, both of Switzerland

[73] Assignee: Werner Tabarelli, Schaan, Austria

[21] Appl. No.: 533,295

[22] Filed: Jun. 5, 1990

[30] Foreign Application Priority Data

Jun. 7, 1989 [AT] Austria ............... 1394/89
Sep. 6, 1989 [AT] Austria ............... 2083/89

[51] Int. Cl.⁵ .............................................. G01B 11/02
[52] U.S. Cl. ..................................... 356/358; 356/43; 356/361; 356/352
[58] Field of Search ............... 356/358, 352, 361, 43, 356/356

[56] References Cited

U.S. PATENT DOCUMENTS

| | | | |
|---|---|---|---|
| 4,329,058 | 5/1982 | James et al. | 356/361 |
| 4,733,967 | 4/1988 | Sommargren | 356/361 |
| 4,813,783 | 3/1989 | Torge | 356/361 |
| 4,909,629 | 4/1990 | Yokokura et al. | 356/358 |

*Primary Examiner*—Samuel A. Turner
*Assistant Examiner*—LaCharles P. Keesee
*Attorney, Agent, or Firm*—Lorusso & Loud

[57] ABSTRACT

An interferometer suitable for length measurements, comprising a laser light source, a beam splitter to divide light stemming from the laser light source into a measuring beam and a reference beam, and recombination means at which the reference beam being guided along a reference path and the measuring beam interfere. The measuring beam travels along a measuring path that leads over a movable measuring reflector and partly through a gaseous ambient medium. The interferometer further comprises photodetector means to analyze optical interference signals stemming from the recombination means. At least one static etalon of a known length is provided to determine or compensate for variable environmental conditions (variable refractive index) of the ambient medium. The etalon comprises two reflection surfaces and is illuminated by light stemming from the laser light source. The space lying inbetween these reflection surfaces is filled with the ambient medium. The etalon or etalons is (are) connected to a flexible optical fibre, respectively, the flexible optical fibre conveying light from the laser light source. A precise illumination of the etalon is obtained, and the etalon can be placed near the measuring path in a simple manner.

26 Claims, 5 Drawing Sheets

INTERFEROMETER WITH ENVIRONMENT SENSITIVE STATIC ETALON

Interferometer, suitable for determining the distance or displacement of a movable part, comprising a laser light source, at least one beam splitter to divide light provided by the laser light source into a measuring beam and a reference beam, recombination means at which the reference beam being guided along a reference path and the measuring beam interfere, the measuring beam traveling along a measuring path that leads over a movable measuring reflector and partly through a gaseous ambient medium, and a detector means comprising at least one photodetector to analyze at least one optical interference signal provided by the recombination means, at least one static etalon of a known length to determine or compensate for variable environmental conditions of the ambient medium, the etalon being illuminated by light stemming from the laser light source and comprising two reflection surfaces, the space lying inbetween these reflection surfaces communicating with the ambient medium.

With such an interferometer, the measuring beam being led along a measuring path through an ambient medium (in most cases air), the result of the interferometric measurement is first present in units of the light wavelength being present in the ambient medium (called air wavelength in the following). To know, for example, the displacement path of a measuring reflector in metric units, the air wavelength must be known to a sufficient exact degree. This air wavelength is dependent on the emission frequency of the laser light source and on the refractive index of the ambient medium. The emission frequency being known, it is possible to measure the pressure, the temperature and the moisture content of the ambient medium and to calculate the refractive index therefrom on the basis of a formula relationship. It is a drawback of this so-called parameter method that the emission frequency must be known very precisely, on the one hand, and that, on the other hand, apart from the parameters temperature, pressure, and moisture contents further parameters, as e.g. the gas composition of the ambient medium (air), affect the refractive index and consequently the air wavelength.

By means of an interferometric comparison of the air wavelength to an embodiment of a measure of a known length it is in principle possible to determine the air wavelength directly. So-called etalons (end measures) with two reflection surfaces being arranged at a known nominal distance are suitable as static embodiments of a measure, the etalon being "open", i.e. the space between the reflection surfaces communicates with the ambient medium. When such etalons are used to measure or compensate for variable environmental conditions (refractive index of the ambient medium) two different difficulties arise. First, it must be guaranteed that the same environmental conditions are actually present between the reflection surfaces of the etalon (with a plurality of etalons, between the reflection surfaces of each etalon) and the measuring path. With known devices, the etalon has often been arranged near assembled components of the interferometer, whereby there is a particularly high risk of a temperature and moisture difference between the ambient medium in the etalon and the measuring path, with the consequence of a falsification of the result of measurement. When using one or several etalons to measure or compensate for the environmental conditions, a further problem is the undesires sensitivity of the etalon with respect to the angle adjustment. The optical path difference determining the interference signal does not only depend on the length of the etalon (distance of the two reflection surfaces), but also on the angle of incidence of the light beams entering the etalon. The allowed angular error is dependent on the desired accuracy of the interferometer and on the length of the etalon. The maximum allowed angular error is for example 15 angle minutes for a collinearly illuminated etalon and a few angle seconds for a divergently illuminated etalon) in case of a typical etalon length of about one centimeter and a desired relative air wavelength accuracy of $10^{-7}$. In any case, the requirement of a high angular accuracy can hardly be satisfied with interferometers of conventional design.

Furthermore, an interferometer is already known (DE-A-37 15 627), that comprises light wave guides integrated an a plane wafer substrate. An air filled device is connected to the wafer substrate, forming some kind of etalon together with the exterior surface of the wafer substrate, the "etalon" in principle being adapted to compensate for variable environmental conditions. But, this "etalon" is rigidly arranged at a fixed position at the side of the wafer substrate remote from the measuring path. Thus, it is not guaranteed that the same environmental conditions (particularly pressure and moisture content) are present on the measuring path and in the "etalon". However, as explained above, this is a necessary requirement for precise results of measurement.

Therefore, it is the object of the invention to provide a compact interferometer of the type mentioned above, that is simple to operate, suitable for industrial distance measurement, and allows a precise measurement of or compensation for the variable environmental conditions being present at the measuring path, whereby the air wavelength actually being present at the measuring path can be exactly determined.

According to the invention this is accomplished in that the etalon(s) is connected to a flexible optical fibre, the flexible optical fibre conveying light from the laser light source.

By connecting the etalon to a flexible optical fibre it is possible, without difficult adjustments to optical components and in a simple manner, to place the etalon in the region of or near to the measuring path, thereby ensuring that substantially equal environmental conditions are in fact present both between the reflection surfaces of the etalon(s) and at the measuring path.

Environmental or medium conditions are regarded as substantially equal, if the corresponding relative difference of the refractive index is in any case less than or equal to the required accuracy for the position or position change measurement of the moving element. If, for example, the measuring uncertainty with a displacement length of one meter should be less than 0.1 microns, said relative difference of the refractive index $\Delta n/n$ should be less than $10^{-7}$, so that medium conditions can be regarded as being essentially the same.

If changes of the pressure, the temperature, the moisture content or the composition of the medium at the measuring path appear, it might be undesirable if one were required to wait until diffusion processes in the etalon establish the "same" conditions. Therefore, each etalon preferably has two openings and a ventilator to generate a gas flow through the etalon(s).

In practice, the etalon end of the optical fibre, i.e. the fibre end closer to the etalon, can be held adjusted with respect to the reflection surfaces of the etalon by means of a preferably adjustable holding means. By doing so the above-mentioned undesired sensitivity with respect to the angular adjustment of the etalon can be removed, this precise adjustment always being maintained irrespective of the exact position of the etalon itself. Thus, there is no need to adjust the etalon with respect to further optical components of the interferometer. On the contrary, one has the liberty to place the etalon at a suitable position near the measuring path. This is an important advantage for practical applications.

According to a preferred embodiment of the present invention, the flexible optical fibre to which the etalon(s) is connected, is a single mode wave guide, preferably a monomode glass fibre. With a collinear illumination of the etalon, where a collimation lens is arranged between the etalon end of the optical fibre and one of the two reflection surfaces of the etalon, and where the light beams enter the space between the two reflection surfaces of the etalon parallel to one another and perpendicularly to the parallel reflection surfaces. Particularly the effect becomes important that when using a single mode wave guide well defined wave fronts are present, allowing optimum wave fronts for the illumination of the etalon after image-forming through a suitable exact collimator lens. With a divergent illumination of the etalon, where the spatial interference pattern is analyzed, the position of the interference rings principally does not depend on the position of the divergent light source, but only on the position and orientation of the etalon and the lens behind the etalon generating the interference ring pattern. In order to obtain a uniformly illuminated etalon, it is important that light is offered to the etalon uniformly in all directions of incidence. In the past, such an uniform light supply was obtained by making the light beam to be analyzed divergent by means of a lens. But, for precision measurements with respect to the spatial interference ring system, both the lens and the wave fronts of the light beam have to be of very high quality. Otherwise, the interference ring system would not be uniformly illuminated, resulting in a false evaluation. For this reason, attempts were made to illuminate the etalon via a ground-glass plate that renders the light completely diffused before it enters the etalon. However, with a ground-glass plate illuminated by coherent laser light one finds an irregular speckle pattern in the focal plane of the lens that exactly forms an image of the interference ring system. The problems mentioned above can be overcome according to a preferred embodiment of the present invention, by illuminating the etalon by means of a monomode optical fibre that ends in a fixed, or fixedly adjustable, distance from one reflection surface of the etalon, the light cone divergently emerging from the monomode optical fibre illuminating the etalon. The end of a single mode wave guide (e.g. a monomode glass fibre) represents a perfect point source of light. In this way, a precise and uniformly illuminated interference ring system is obtained in a simple manner. Interferences of same inclination, that emerge from the partially reflecting etalon reflection surface lying remote from the end of the monomode optical fibre, are imaged by a condenser lens behind this reflection surface. A photodetector unit picking up the interference ring system is arranged in the focal plane radially outside the optical axis.

In order to compensate for the variable environmental conditions, according to a preferred embodiment of the invention, the frequency of the laser light source is varied as a function of the refractive index of the ambient medium being present between the reflection surfaces of the etalon(s), so that the wavelength in the ambient medium remains constant. This stabilization of the air wavelength allows a simple evaluation of the interference signals produced by the etalon, because the only important point is to hold this interference signal constant. In the case of a divergently illuminated etalon, this is, for example, possible by means of a differential diode that captures a ring of the interference ring system. Depending on the signals of the differntial diode, an electronic control unit may change the frequency of the laser light source so that the picked-up interference ring always stands in the center of the differential diode, by which the air wavelength is maintained constant.

If a laser diode is used as a laser light source according to a preferred embodiment of the invention, and light is fed back to the laser resonator from a preferably collinearly illuminated etalon in a frequency-selective manner, advantage can be taken of the property of laser diodes that feed-back light strongly affects their emission frequency. The frequency that is preferably fed back into the laser resonator from the etalon, within a certain frequency range, causes the emission frequency of the laser diode to lock to this feed-back frequency. The aforesaid control of the laser diode by means of an optical feed-back can be supported by an electronic control that controls the parameters (injection current, operating temperature) affecting the emission wavelength of the laser diode as a function of the air wavelength measured by the etalon.

In order to ease the handling of the etalon(s), it is favorable if the end of the optical fibre lying remote from the etalon is releasably connected to an optical fibre conveying light from the laser light source. This connection place can, for example, be arranged on a housing in which the laser diode and/or an analyzing electronic unit is contained. Thus, the etalon has only to be plugged in. In order to obtain an adjustment of the glass fibre length leading to the etalon, it is favorable according to a preferred embodiment of the present invention, if a further optical fibre is arranged between the laser light source and the optical fibre connected to the etalon, the light source end of that further optical fibre releasably connected to an optical fibre conveying light from the laser light source by means of a first fibre connector, and the etalon end of that further optical fibre releasably connected to said optical fibre connected to the etalon by means of a second fibre connector. By means of this further optical fibre a simple adjustment of the glass fibre length to respective local factors as well as a simple laying of the optical fibre is possible.

According to a preferred embodiment of the invention, it is provided that the overall optical length of the optical fibres lying between the laser light source and the etalon is at least one meter, preferably at least ten meters. By this feature it is possible to avoid adverse optical feed-back into the laser light source from the "quasi-etalon" that is formed between the laser light source and the first reflection surface of the etalon. As a result of the large optical fibre length that is best obtained by a sufficiently long further optical fibre, the reflection maxima from the "quasi-etalon" come close enough together so that the feed-back can be considered as a quasi-continuous feed-back within the framework of the required wavelength accuracy, whereby this quasi-continuous feed-back does not affect the emission frequency of the laser light source, particularly of a feed-back sensitive laser diode, within the limits of the required wavelength accuracy.

If it is not possible to measure or keep constant with sufficient accuracy the interference signal (e.g. the position of an interference ring) stemming from a comparatively short etalon (distance of the reflection surfaces in the region of a few millimeters), a second etalon being about 10 to 30 times longer can be used, this second etalon allowing a higher accuracy evaluation of the interference pattern. The first and second etalon form a so-called step etalon.

Further advantages and features of the invention will be described in more detail in the following description of the drawings.

Figure 1:
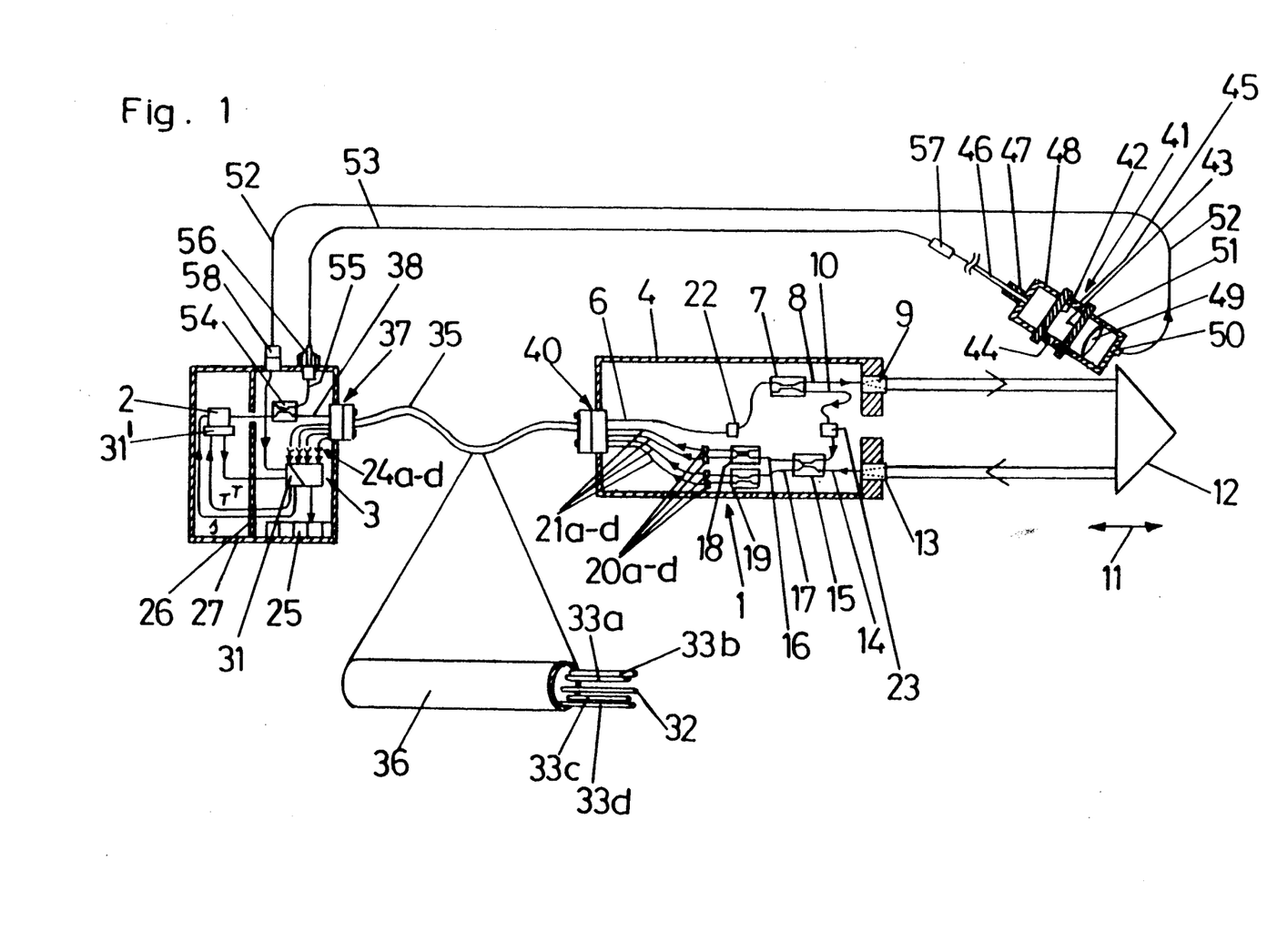
FIG. 1 shows a schematic representation of an embodiment of the inventive interferometer, a part of the fibre cable leading to or from the interferometer head being shown on an enlarged scale.

The interferometer represented in FIG. 1 comprises an interferometer head 1, a laser diode 2 to supply laser light to the interferometer head, and a detector unit 3 for analyzing the interference signals coming from the interferometer head. The interferometer head 1 is surrounded by a housing 4 and contains a plurality of optical components being interconnected by monomode glass fibres and to be described in the following in more detail. The laser light supplied via the optical fibre 6 from the laser diode 2 reaches a beam splitter 7 that separates the light into a measuring beam and a reference beam. The measuring beam is guided to the measuring path, that lies outside the interferometer head 1 and leads through the ambient medium (e.g. air), via the glass fibre 8 and the output coupling lens 9 (gradient index lens). The reference beam passes through the reference fibre 10 within the interferometer head 1. The retroreflector 12 is mounted on a component (not shown) that is movable in the direction of double arrow 11. This retroreflector 12 reflects the measuring beam back to the interferometer head 1, the reflected beam being displaced in a direction normal to the beam direction. The measuring beam enters the glass fibre 14 via the input coupling lens 13. The reference beam being guided in the reference fibre 10 and the measuring beam returning from the measuring path interfere in the recombination means 15 that is realized as a beam splitter. Two further beam splitters 18 and 19 are connected to the two complementary output terminals 16 and 17 of the recombination means. The phase-shifted interference signals enter the optical fibres 21a-21d leading to the detector unit 3 through the polarizing filters 20a-20d. From these four interference signals that are phase-shifted by 90 degrees with respect to one another, apart from the displacement course of the retroreflector 12, the direction of movement and the modulation depth can be determined, too. The interferometer shown is operated at to polarizations being perpendicular to one another. To that end a polarizer 22 is provided. Both polarization components run through the same measuring path. A quarter-wave plate 23 is arranged in the reference path 10 in order to phase shift one polarization component with respect to the other one by 90 degrees.

The detector unit comprises four photodetectors 24a-24d. These four photodetectors 24a-24d produce electrical interference signals from the optical interference signals, the electrical signals being analyzed by an electronic unit. The result (e.g. the location of the retroreflector 12) is displayed in a display 25.

The laser diode 2 is arranged in a housing region of the light source and analyzing housing 27, the housing region being separated by a thermally insulating wall.

In order to compensate for variable environmental conditions (variations of the refractive index of the ambient medium on the measuring path) a static etalon is provided, the space between the reflection surfaces 42 and 43 of the etalon communicating with the ambient medium via the opening 44. The length of the etalon 41 (distance of the two partially translucent reflection surfaces 42 and 43) is known and typically is about a few millimeters. A ring 45 having a negligible small thermal coefficient of expansion (e.g. made of glass ceramics) holds the two reflection surfaces 42 and 43 at the known desired distance. According to the invention the etalon is connected to a flexible optical fibre 46 that conveys light from the laser diode 2. This optical fibre 46 is represented by a single solid line (as are all other optical fibres) except for the region very close to the etalon 41. This flexible optical fibre 46 makes it possible to place the etalon at a suitable position and orientation in the region of the measuring path without the use of optical components that are difficult to adjust. Thus, it is guaranteed that at the measuring path along which the retroreflector 12 moves, and between the reflection surfaces 42 and 43 of the etalon 41, the same environmental conditions, and therefore the same refractive index, are actually present.

In order to obtain a proper adjustment of the glass fibre end with respect to the reflection surfaces 42 and 43, said end is hold in place by a ring-shaped holding means 47 that is in turn mounted on a spacer 48. Thus, the required angular accuracy with respect to the guidance of the optical beam is guaranteed.

With the present embodiment the optical fibre 46 is a monomode glass fibre, the end of which forms an ideal point light source. Thus, a precise and uniformly illuminated interference ring system is generated behind the reflection surface 43, the interference ring system being imaged by the lens 49. A differential diode 50, which is secured to a holder 51 (as is the lens 49), measures or picks up one interference ring of the interference ring system and supplies a signal in response to the position of the interference ring, the signal being transmitted to the laser diode control unit 31 via the electrical line 52 that is plugged in by means of the plug 58. The emission frequency of the laser diode 2 is controlled by the injection current and the operating temperature on the one hand, and by a frequency selective optical feed back from the etalon 41 on the other hand. The ambient medium present at the measuring path is also present between the two reflection surfaces 42 and 43 of the etalon 41, that are spaced at a distance of e.g. about 5 millimeters. If the refractive index of the ambient medium and consequently the wavelength in the ambient medium changes within the etalon 41, the position of the interference ring being measured by the differential diode 50 will change as well. Upon this, the control unit 31 corrects the operating parameters via the injection current I and the laser diode temperature T (Peltier element 31a), so that the emission frequency changes just in such a manner that the wavelength in the ambient medium at the measuring path and in the etalon 41 remains constant. In addition to this electronic control of the emission frequency, an optical control of the laser diode takes place by the fact that light is frequency selectively fed back into the laser diode depending on the refractive index in the ambient medium that is present between the reflector surfaces of the etalon 41. This feed-back light causes the laser diode to preferably emit light with the frequency of the feed-back light. However, in order to obtain such an optical feed-back signal the collinearly illuminated etalon according to FIG. 2 seems to be more suitable.

According to a preferred embodiment of the invention a further optical fibre 53 is arranged between the optical fibre 46 connected to the etalon 41 and the optical fibre 55 that is supplied with laser light from the laser diode 2 via the beam splitter 54. The light source end of this further optical fibre 53 is releasably connected to the optical fibre 55 by means of a first fibre connector 56 at the housing 27. The etalon end of this further optical fibre 53 is releasably connected to the optical fibre 46 that is connected to the etalon 41. This further optical fibre can be easily changed according to specific needs and can be replaced in case of damage.

In order to ensure that the emission frequency of the laser diode is not affected in an undesirable manner by uncontrollable feed back, as it occurs e.g. from the quasi etalon between the exterior surface of the laser diode resonator and the first mirror surface of the etalon 41, an optical fibre 53 with an optical length of at least one meter is preferably arranged between the laser diode 2 and the etalon 41.

On the basis of similar considerations an optical fibre 32 is arranged between the interferometer head 1 and the laser diode 2, the optical length of which is at least one meter.

The monomode optical fibre 32 supplying light to the interferometer head 1 and four plastics-material optical fibres 33a–33d supplying interference signals stemming from the optical fibres 21a–21d to the photodetectors 24a–24d are combined to a cable 35 that is surrounded by a sheathing 36. The fibre cable 35 is releasably connected to optical fibres in the housing 27 of the laser diode 2 and the analyzing unit 3 by means of a two part multiple fibre connector 37. Particularly, the optical fibre 38 coming from the laser diode is releasably connected to the monomode glass fibre 32. The four plastics-material optical fibres 33a–33d of the fibre cable 35 are connected to optical fibres that lead to the photodetectors 24a–24d by means of the plug 37. At the interferometer head end, the fibre cable 35 is connected by means of a second fibre connector 40 to releasably connect the optical fibres of the fibre cable 35 to corresponding optical fibres and wires in the interferometer head. Particularly, the monomode glass fibre 32 is connected to the monomode glass fibre 6 by means of the plug 40. Furthermore, an optical coupling of the optical fibres 21a–21d to the optical fibres 33a–33d of the fibre cable 35 takes place by means of the multiple connector 40. The fibre cable 35 can easily be adapted to specific needs noting the minimum optical length. It can easily be placed and be replaced in case of damage. This replacement can even be done by the user as a difficult adjustment after the replacement is not necessary.

Figure 2:
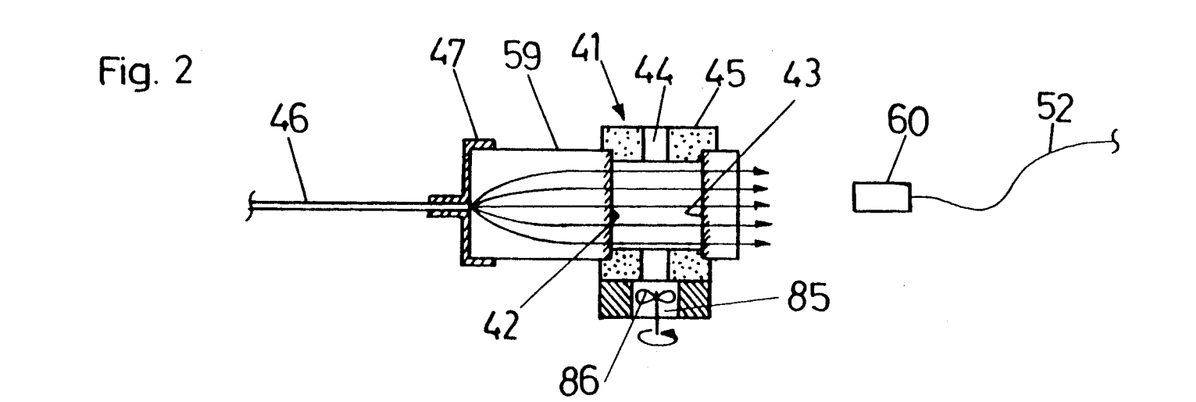
FIG. 2 shows an embodiment of a collinearly illuminated etalon that is connected to an optical fibre.

FIG. 2 shows an embodiment of a collinearly illuminated etalon 41 that is connected to an glass fibre 46 guiding light from the laser light source and having a length that is at least sufficient to place the etalon near the measuring path as it is e.g. shown in FIG. 1.

In order to rapidly establish again the same conditions at the measuring path and within the etalon 41 after variations of the ambient medium that surrounds the etalon 41, the etalon 41 is provided with two openings 44 and 85, through which a stream generated by the ventilator 86 may flow. During the measurement process this flow is turned off.

The etalon shown in FIG. 2 comprises a collimator lens 59 (gradient index lens) to which the glass fibre 46 is attached in a precise manner by means of a holding means. The plane exit surface of the gradient index lens 49 is preferably mirror-coated and forms one of the two partially reflecting reflection surfaces 42 and 43 of the etalon 41. A zerodur ring 45 provided with openings 44 holds the reflection surfaces 42 and 43 at a well defined distance. A photodetector 60 measures the amplitude of the light being transmitted through the partially translucent reflection surface 43, this amplitude containing the information about the environmental conditions being present in the etalon 41. The photodetector 60 is connected to a control and analyzing unit via an electrical line 52.

Figure 3:
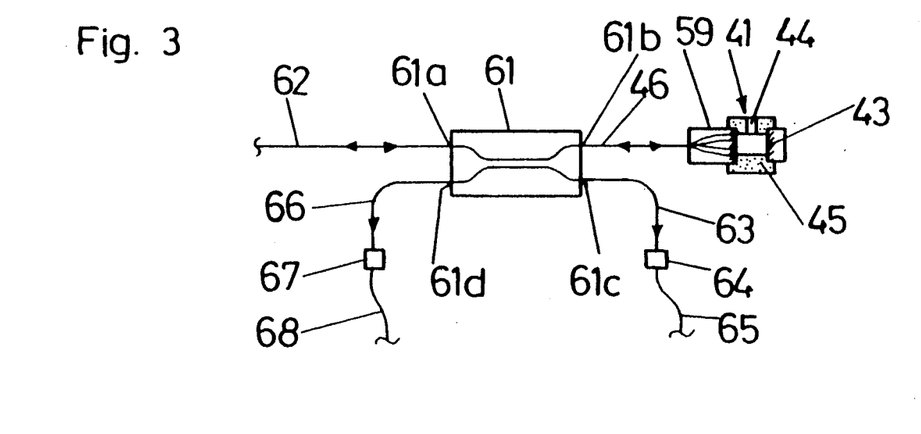
FIG. 3 shows a schematic representation of an assembly to evaluate the interference signals stemming from a collinearly illuminated etalon.

In order to be independent of intensity variations of the laser light source, it is favorable to measure the intensity of the laser light source as well and to evaluate the interference signal stemming from the etalon 41 with respect to the value corresponding to the intensity of the laser light source. This is possible by using the embodiment according to FIG. 3. A X-fibre coupler 61 is connected via its first terminal 61a to an optical fibre 62 that conveys light from a laser light source. The light being supplied to the fibre coupler 61 is split to the optical fibres 46 and 63 that are connected to the second 61b and third 61c terminal, respectively. The optical fibre 63 leads to a photodetector 64 that supplies via line 65 an electrical reference signal being dependent on the light intensity of the laser light source. The interference signal stemming from the etalon 41 is coupled back into the optical fibre 46 and enters the optical fibre 66 via the fourth terminal 61d of the fibre coupler 61. From there the signal reaches the photodetector 67 that supplied via the line 68 an electrical interference signal that is evaluated together with the electrical reference signal on line 65 in an electronic analyzing or control unit (not shown) for the laser light source. The feed-back signal from the etalon 41 reaches the laser light source via the optical fibre 62 as a frequency selective feed-back signal being dependent on the environmental conditions. In order to increase the accuracy of measurement of the interference pattern, two or more etalons of different length can be provided, allowing a successive increase in accuracy of the interference signal information starting from the shortest etalon.

Figure 4:
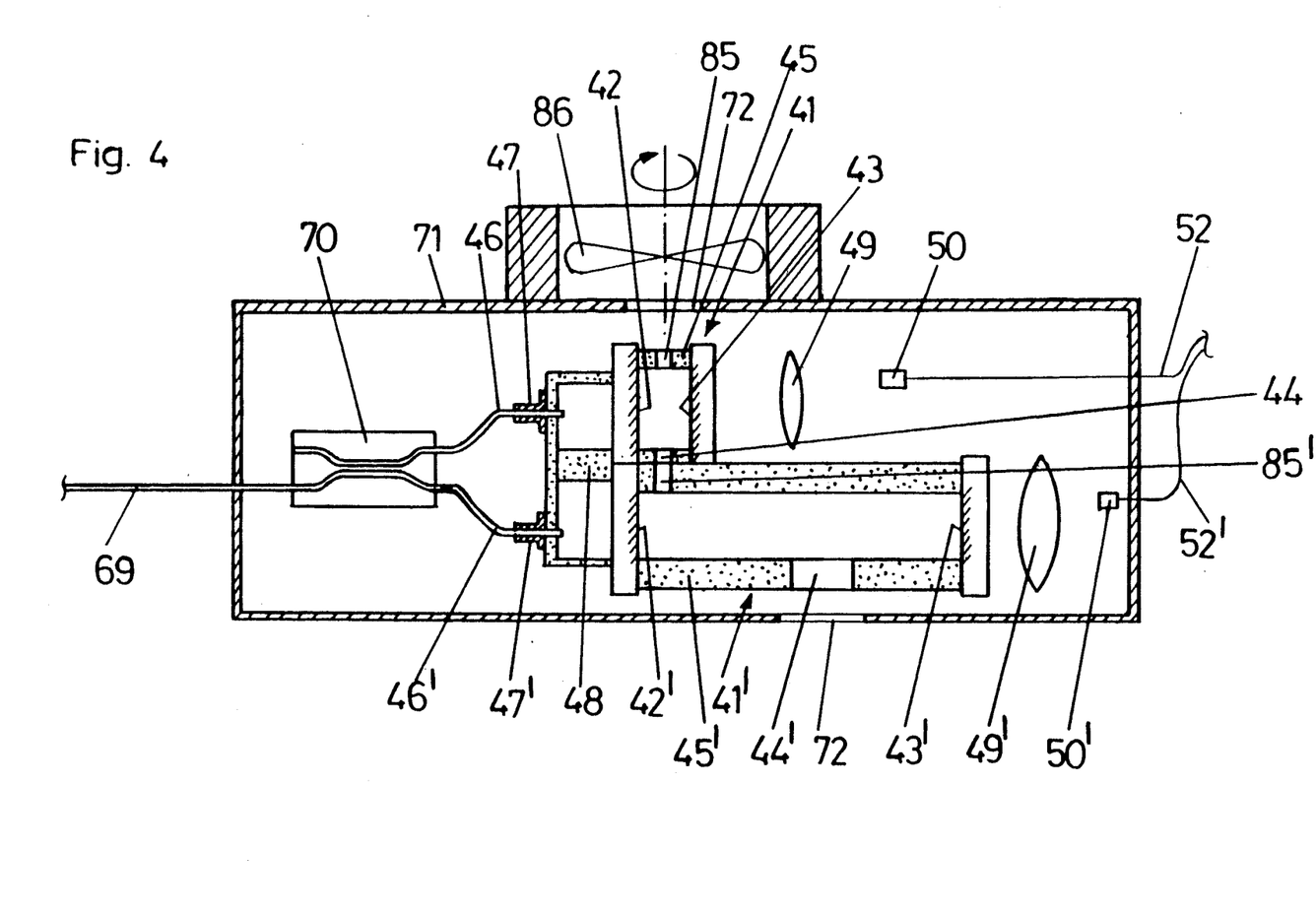
FIG. 4 shows a schematic representation of a step etalon consisting of two etalons of different length.

With the embodiment according to FIG. 4 two etalons 41 and 41' of different length are provided, that are basically built in the same manner as the embodiment of FIG. 1. The light being supplied via the glass fibre 69 is split up to the two optical fibres 46 and 46' in the beam splitter 70. The shorter etalon comprises two partially reflective reflection surfaces 42 and 43 that are held in place by the spacer ring 45 that is provided with openings 44. The end of the monomode glass fibre 46 is held by a holding means partly surrounding the fibre and being mounted on a spacer 48. In the focal plane of a lens that is held in place in a manner that is not shown in detail, a interference ring system is generated which is picked up by the photodetector 50.

The longer etalon 41' is principally of the same construction as the shorter etalon 41. Therefore, the corresponding components are referred to by the same reference numbers as used for the etalon 41, however, with an apostrophe added.

The step etalon shown in FIG. 4 is arranged in a housing 71 that comprises openings 72 and 72' that allow a communication of the etalon inner spaces with the ambient medium (air). This is made easier if ventilator 86 generates a flow according to the path 72-44'-85'-44-85-73. By an interferometric comparison with a nominally static embodiment of a measure (etalon), it is possible to measure and compensate for the influences of the environment on the refractive index of the air. However, a completely static etalon is very difficult to realize, as the length of the length standard (the spacer ring in the etalon) itself depends on environmental influences, particularly on the temperature. By using suitable materials as e.g. special glass ceramics with a very small thermic coefficient of expansion, the environmental influence on the etalon can be held as low as $10^{-6}$. While this inaccuracy, essentially due to the temperature dependence of the etalon, may be tolerable for short measuring paths, this inaccuracy might be too important with measuring paths in the region of meters.

Figure 5:
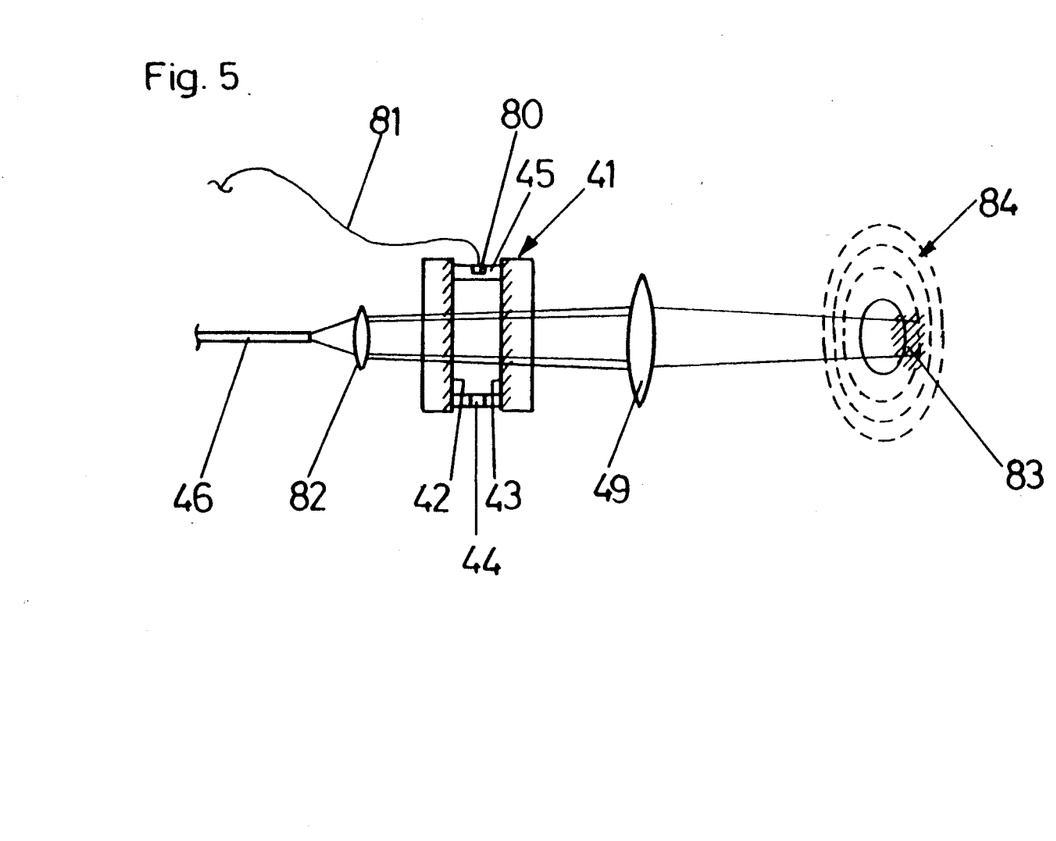
FIG. 5 shows a further schematically represented embodiment.

An obvious idea, to stabilize the temperature of the etalon as it is e.g. done with argon ion lasers, leads to nothing here, as the temperature in the etalon and on the actual measuring path would not be equal. Thus, the wavelength would not be equal, and the measurement would be wrong. An improvement with respect to the accuracy of measurement can obtained according to an inventive feature by dropping the requirement of absolute stability of the length standard (etalon) and by simply measuring the temperature of the etalon, more precisely of the spacer ring of the two reflection surfaces 42 and 43. To this end, a temperature sensor 80 can be arranged in a bore of the spacer ring 45, as it is shown in FIG. 5. From the known dependence of the etalon length as a function of the temperature, the result of the actual length measurement may be corrected easily. With this method for improving the accuracy of measurement a small thermic coefficient of expansion of the material for the spacer ring in the etalon is not so important. However, it is important to actually know the thermic coefficient of expansion. Thus, cheaper materials having higher coefficient of expansion may be used. In order to measure the temperature, quartz temperature sensors 80 are particularly adapted. These sensors are integrated in an electrical oscillator circuit by means of lines 81, the temperature-dependent resonance frequency of the oscillator circuit being measured. Tuning fork quartz oscillators are particularly adapted, as they exhibit a strong and almost linear frequency-temperature characteristic. These quartz oscillators can be driven by simple oscillator circuits. Important properties of such a temperature measuring system are a small energy consumption, a good long-term constancy and small dimensions.

With the length measurement of workpieces of a given material, a further possibility to compensate for the thermal expansion of the etalon would consist of producing the spacer ring from the etalon of the same material as the workpiece. By doing so, there is no need to calculate the thermic expansion of the workpiece, as this expansion is automatically compensated for, because the temperature-induced relative length variation of the workpiece and the etalon are equal at the same temperature.

As compared to the etalon assembly of FIG. 1, the etalon assembly shown in FIG. 5 further differs in that a lens is arranged between the end of the monomode glass fibre 46 and the etalon 41, the lens reducing the divergence of the light emerging from the glass fibre, and in that all the light is concentrated onto a out-of-center area (dashed area 83) of the interference ring system. The light beam being, nearly collinear after the lens 82, enters the etalon 41 forming a small angle with the normal to the two reflection surfaces 42 and 43 (i.e. slightly inclined). In contrast to a completely divergent illumination of the etalon where a interference ring system is obtained as indicated by dashed circles 84, a higher light intensity in the area 83 is achieved with the embodiment according to FIG. 5. In this area a differential photodiode (not shown) can be placed. By this almost collinear illumination of the etalon and the resulting local increase of intensity, a definite and reliable measurement of the transversal interference pattern is possible.

Figure 5A:
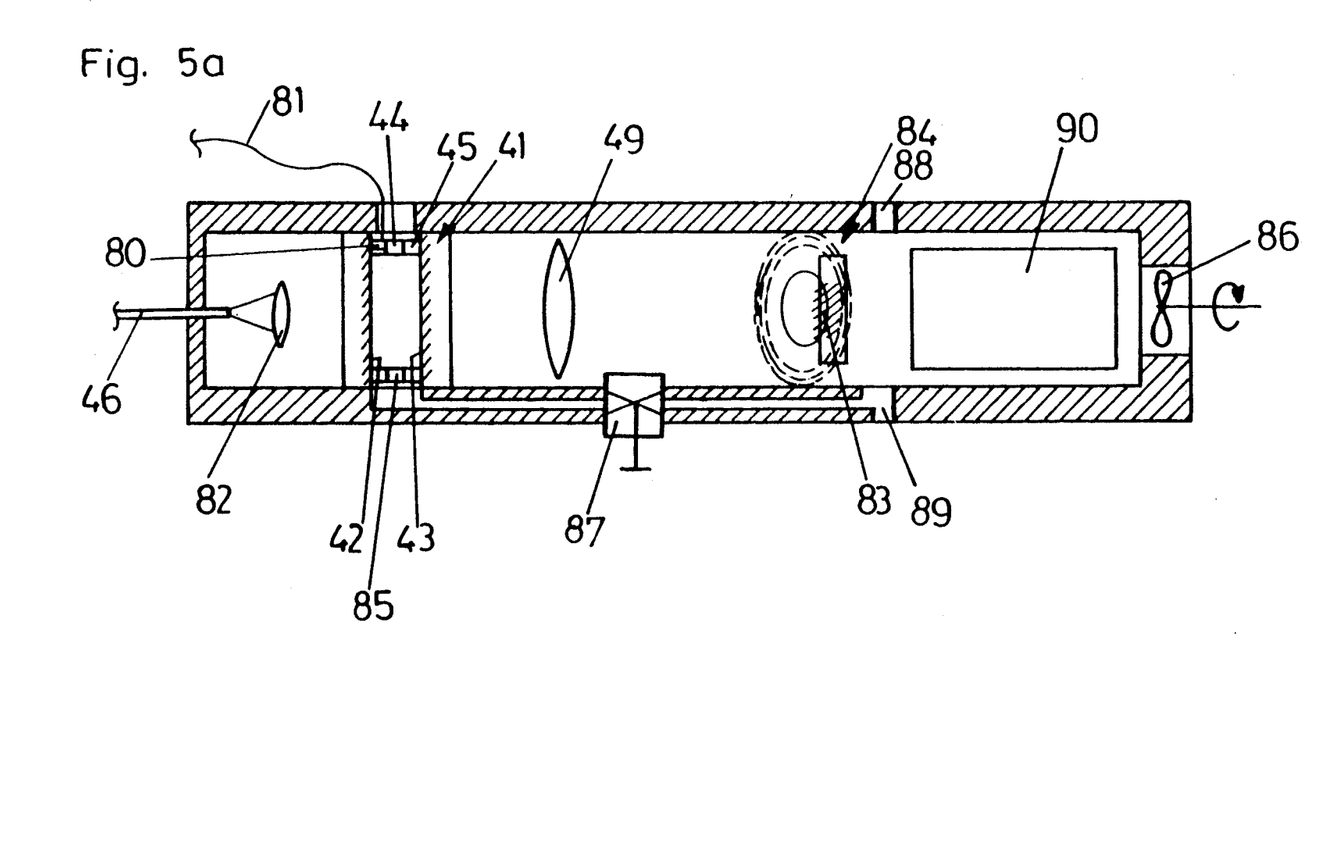
FIG. 5a an encased variant of the embodiment according to FIG. 5.

The ventilator 86 of the encapsulated version according to FIG. 5a not only serves to equalize air variations, but to cool a circuit unit 90 as well. In order to avoid the switching on and off of the ventilator 86 with each measuring process, the air flow through the etalon is only interrupted by means of a magnetic valve 87, while air is supplied to the continuously running ventilator 86 through the openings 88 and 89.

With the embodiments shown, the interference signal obtained from the etalon(s) is used to change the frequency of the light source in response to the environmental conditions just in such a manner that the air wavelength remains constant. This stabilization of the air wavelength simplifies the reading-out of the interference signals stemming from the etalon. However, in principle it is also possible to continually measure the air wavelength or the refractive index of the ambient medium, e.g. by using a diode array behind the etalon, and to numerically compensate in an electronic analyzing and evaluation unit. The invention is not limited to the constructive solutions of the embodiments shown. Numerous constructive solutions are possible for the structure of the etalons and the manner of connecting the optical fibre to the etalon.

What is claimed is:

1. Interferometer, suitable for determining the distance or displacement of a movable part, comprising:
    a laser light source;
    at least one beam splitter to divide light provided by the laser light source into a measuring beam and a reference beam;
    recombination means at which the reference beam being guided along a reference path and the measuring beam interfere, the measuring beam traveling along a measuring path that leads over a movable measuring reflector and partly through a gaseous ambient medium, and a detector means comprising at least one photodetector to analyze at least one optical interference signal provided by the recombination means; and at least one static etalon of a known length to determine or compensate for variable refractive indices of the ambient medium, the etalon being illuminated by light stemming from the laser light source and comprising two reflection surfaces, the space lying inbetween these reflection surfaces communicating with the ambient medium, characterized in that said at least one etalon is connected to a flexible optical fibre, the flexible optical fibre conveying light from the laser light source.

2. Interferometer according to claim 1, characterized in that each flexible optical fibre connected to an etalon is a single mode wave guide, preferably a monomode glass fibre.

3. Interferometer according to claim 1, characterized in that the optical fibre connected to an etalon at one end is releasably connected to an optical fibre conveying light from the laser light source at the other end remote from the etalon.

4. Interferometer according to claim 3, characterized in that a further optical fibre is arranged between the laser light source and the optical fibre connected to the etalon, the light source end of that further optical fibre releasably connected to an optical fibre conveying light from the laser light source by means of a first fibre connector, and the etalon end of that further optical fibre releasably connected to said optical fibre connected to the etalon by means of a second fibre connector.

5. Interferometer according to claim 1, characterized in that the overall optical length of the optical fibre(s) lying between the laser light source and the etalon is at least one meter, preferably at least 10 meters.

6. Interferometer according to claim 4, characterized in that the optical length of said further optical fibre is at least one meter, preferably at least 10 meters.

7. Interferometer according to claim 1, characterized by two or more open etalons of different lengths, which are each connected to a flexible optical fibre.

8. Interferometer according to claim 1, characterized in that the etalon end of the optical fibre is adjusted by a holding means with respect to the reflection surfaces of the etalon.

9. Interferometer according to claim 1, characterized in that the optical, preferably monomode fibre illuminating the etalon ends at a fixed or fixedly adjustable distance from one of the reflection surfaces of the etalon, the divergent light cone emerging from the optical fibre illuminating the etalon.

10. Interferometer according to claim 9, characterized in that a condenser lens is arranged behind the other reflection surface of the etalon, a photodetector unit measuring the system of interference rings being arranged in the focal plane of said condenser lens and preferably radially outside the optical axis.

11. Interferometer according to claim 10, characterized in that the photodetector unit is a differential diode.

12. Interferometer according to claim 9, characterized in that a lens reducing the divergence of the light cone emerging from the optical fibre is arranged between the etalon and the optical fibre, and that the almost collinear light beam behind the lens enters the etalon and forms an angle with respect to a normal to the two reflection surfaces of the etalon.

13. Interferometer according to claim 1, characterized in that a collimator lens is arranged between the etalon end of the optical fibre and one of the two reflection surfaces of the etalon, the light rays entering the space between the parallel reflection surfaces of the etalon being parallel with respect to one another and normal to said reflection surfaces.

14. Interferometer according to claim 13, characterized in that the collimator lens is a gradient index lens having a mirror-coated plane surface that forms one reflection surface of the etalon.

15. Interferometer according to claim 13, characterized in that a photodetector measuring the interference signal supplied by the etalon is arranged behind the other of the two reflection surfaces of the etalon.

16. Interferometer according to claim 13, characterized in that a X-fibre-coupler having four terminals is arranged in front of the etalon and the collimator lens, the first terminal being connected to an optical fibre conveying light from the laser light source, the opposite second terminal being connected to the optical fibre leading to the etalon, the third terminal lying adjacent to said second terminal and being connected to an optical fibre leading to a first photodetector, and the fourth terminal lying adjacent to said first terminal and being connected to an optical fibre leading to a second photodetector.

17. Interferometer according to claims 1, characterized in that the frequency of the laser light source is varied depending on the refractive index of the ambient medium being present between the reflection surfaces of the etalon, so that the wavelength in the ambient medium remains constant.

18. Interferometer according to claim 17, characterized in that the laser light source is a laser diode, light being frequency selectively fed back into the laser resonator from at least one etalon, the preferred feed back frequency depending on the refractive index of the ambient medium being present between the two reflection surfaces of the etalon or etalons.

19. Interferometer according to claim 1, characterized in that the etalon further comprises a temperature sensor to measure the temperature of the spacer between the two reflection surfaces of the etalon.

20. Interferometer according to claim 19, characterized in that the temperature sensor is placed into a bore in the spacer.

21. Interferometer according to claim 19, characterized in that the temperature sensor is a quartz oscillator temperature sensor, preferably a tuning-fork quartz oscillator.

22. Interferometer according to claim 1, characterized by means for the exchange of the gaseous medium in the etalon or etalons.

23. Interferometer, suitable for determining the distance or displacement of a movable part, comprising:
a laser light source;
at least one beam splitter to divide light provided by the laser light source into a measuring beam and a reference beam;
recombination means at which the reference beam being guided along a reference path and the measuring beam interfere, the measuring beam traveling along a measuring path that leads over a movable measuring reflector and partly through a gaseous ambient medium, and a detector means comprising at least one photodetector to analyze at least one optical interference signal provided by the recombination means;

at least one static etalon of a known length to determine or compensate for variable environmental conditions of the ambient medium, the etalon being illuminated by light stemming from the laser light source and comprising two reflection surfaces, the space lying inbetween these reflection surfaces communicating with the ambient medium, characterized in that said at least one etalon is connected to a flexible optical fibre, the flexible optical fibre conveying light from the laser light source; and said at least one etalon being provided with two openings, and a ventilator causes a causes a flow through said at least one etalon.

24. Interferometer according to claim 23, characterized in that the ventilator can be switched off during the actual measurements.

25. Interferometer according to claim 23, characterized in that the flow through said at least one etalon can be shut off with the ventilator running.

26. The interferometer of claim 1 wherein said at least one etalon comprises a plurality of etalons which are connected to a flexible optical fibre conveying light from the laser light source.

* * * * *